United States Patent Office 3,154,509
Patented Oct. 27, 1964

3,154,509
SOLUTIONS OF POLYMERS IN SOLVENT COMPRISING ANTIMONY TRICHLORIDE AND PROCESS FOR PREPARING SAME
Norman Van Gorder, Scotch Plains, and Amerigo F. Caprio, Chatham, N.J., assignors to Celanese Corporation of America, New York, N.Y., a corporation of Delaware
No Drawing. Filed July 13, 1960, Ser. No. 42,509
15 Claims. (Cl. 260—29.1)

This invention relates to an improved process for the formation of shaped articles such as filaments of polymeric materials.

There exists a wide variety of synthetic polymers which are suitable for the manufacture of shaped articles, e.g., filaments and fibers for the manufacture of textiles, and films. Many of these polymers have nitrogen, oxygen, and/or sulfur atoms as an integral part of the polymer chain and/or contain cyanide groups attached to carbon atoms in the polymer chain. Polymers containing nitrogen in the polymer chain include the polyamides proper, e.g., the nlyons, wherein repeating —NRCO— groups are attached to carbons on either side, the polyurethanes which contain repeating —NRCOO— groups, and the polyureas which contain repeating —NRCONR— groups, where R is hydrogen or a monovalent organic radical, e.g., lower alkyl. A group of well known polymers containing oxygen in the polymer chain is the polyesters which contain repeating —CO—O— groups, while a group of polymers containing sulfur in the polymer chain is the polysulfones which contain repeating —SO$_2$— attached to carbon on either side. The usual method of forming many of these polymers into shaped articles such as filaments and films is to extrude the melted polymer through suitably shaped openings, e.g., the orifices of a spinnerette in the case of the melt spinning of filaments or a slot in the case of film formation.

While melt extrusion techniques are often suitable for many of the aforementioned polymers, it may be desired in some instances to obtain shaped polymer articles without melting the polymer. For example, it may be desired to avoid the degradation that often takes place when some polymers are heated to a degree sufficient to melt them. In other cases it may be desired in producing shaped articles of polymers to use the facilities of an existing plant which are more designed for wet spinning than for melt spinning.

It is an object of this invention to provide an improved method of forming shaped articles of polymers containing nitrogen, oxygen and/or sulfur in the polymer chain and/or containing cyanide groups attached to carbon atoms in the polymer chain. It is a further object of this invention to provide a process of forming shaped articles of the aforementioned polymers without the necessity for melt spinning. Other objects will be apparent from the following detailed description and claims.

In accordance with one aspect of the invention, a polymer containing nitrogen, oxygen, and/or sulfur in the polymer chain and/or containing cyanide groups attached to carbon atoms in the polymer chain is dissolved in a solvent comprising antimony trichloride to form a solution which may be extruded through a suitably shaped opening, e.g., the orifices of a spinnerette to form filaments, or a slot-shaped opening to form films. It has been found that spinning solutions prepared in this manner have a high degree of stability as indicated by little or no lowering of the inherent viscosity of the polymer when the solution is allowed to stand for a period of time.

The polymer may be dissolved in molten antimony trichloride in which case the solution is generally prepared at a temperature above 73° C., the melting point of the solvent. In some cases, solutions which are stable at room temperature may be prepared after first dissolving the polymer at or above 73° C. The antimony trichloride may also be used with a lesser amount by weight of a diluent to yield a solution which has a solidification temperature lower than it would be if antimony trichloride were used alone. The diluent may be used, for example, in an amount up to about 40% by weight of the total solvent. Some diluents which may be used are, for example, acetone, carbon tetrachloride and nitromethane.

The process of this invention may be applied, for example, to fiber and film forming linear polyamides having repeated structural units of the formula —NR—Y—NR'—CO—Y'—CO— 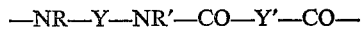

which result from the condensation of a dicarboxylic acid or a derivative, e.g., a salt, acyl halide or ester of such an acid, with a diamine, polyamides which have repeating structural units of the formula —NR—Y—CO— which result from the autocondensation of aminocarboxylic acids or lactams of such acids, fiber and film-forming polyurethanes having repeating structural units of the formula —NR—Y—NR—CO—O—Y'—CO—O—, resulting, for example, from the condensation of a diisocyanate with a diamine, a diamine with a diurethane or a diamine with phosgene, fiber and film-forming polyesters having repeating structural units of the formula —CO—Y—CO—O—Y'—O— resulting from the condensation of a dihydric phenol or alcohol with a dicarboxylic acid or derivative, e.g., an ester, salt or acyl halide thereof, fiber and film-forming polyesters having repeating structural units of the formula —CO—Y—O— resulting from the autocondensation of a hydroxycarboxylic acid or lactones of such acids, and fiber and film-forming polysulfones haivng repeating structural units of the formula —SO$_2$—Y— resulting, for example, from the copolymerization of sulfur dioxide and olefins or from the oxidation of polysulfides prepared by condensing disodium mercaptides with dihalides, wherein the R's are hydrogen or monovalent organic radicals, e.g., lower alkyl such as methyl or ethyl, and the Y's are divalent organic radicals such as alkylene containing 1 to 10 carbon atoms e.g., ethylene, tetramethylene or hemamethylene, arylene such as para- or meta-phenylene, paraxylylene or para-diethylene benzene, cycloalkylene such as 1,4-cyclohexylene, and in the case of polyamides, polyurethanes, and polyureas, divalent heterocyclic radicals such as those derived from piperazine or an alkyl substituted piperazine wherein the open bonds are attached to nitrogen atoms.

Some specific polyamides are, for example, polymers of the following compounds: para-aminobenzoic acid and its lactam, 1-carboxymethyl-4-aminocyclohexane and its lactam, 1-carboxy-4-aminocyclohexane and its lactam and 1-carboxy-3-aminocyclopentane and its lactam.

Some specific polyurethanes which may be dissolved in accordance with this invention, are for example, the condensation product of tetramethylene diamine and bis-(chloroformate) of butanediol-1,4, which has a melting point of 220° C., the condensation product of piperazine and the bis(chloroformate) of bis(p-hydroxyphenyl) propane-2,2 having a melting point of 230-245° C., the condensation products of piperazine and the bis(chloroformate) of cis-1,4-cyclohexylene glycol having a melting point of 275° C. and the condensation product of piperazine and the bis(chloroformate) of trans-1,4-cyclohexylene glycol having a melting point of above 390° C.

Specific polyureas which may be dissolved in a solvent comprising antimony trichloride are for example, the condensation product of hexamethylene diisocyanate and hexamethylene diamine which has a melting point above 300° C. the condensation product of m-phenylene diisocyanate and m-phenylene diamine, or the condensation product of hexamethylene diamine or monamethylene diamine with phosgene.

Some polymers containing cyanide groups attached to carbon atoms in the polymer chain are, for example, acrylonitrile polymers, e.g., those containing a preponderance of acrylonitrile units in the polymer chain such as polyacrylonitrile and copolymer of acrylonitrile and methyl acrylate and/or vinyl pyridine or methyl vinyl pridine, and polymers of at least 50 mol percent of vinylidene cyanide, e.g., copolymers of 50 mol percent of vinylidene cyanide and 50 mol percent of vinyl acetate, styrene or butadiene.

The solutions formed in accordance with this invention may contain, for example, 5 to 30%, preferably 10 to 25% by weight of polymer based on the weight of the solution. The solution may be prepared at a temperature within a wide range, e.g., 20° C. (if a diluent is used) to 150° C., and may be extruded to form shaped articles at a temperature in the range of 20° C. to 150° C.

A wide variety of liquids in which the polymer is insoluble may be used as the coagulating bath in the formation of shaped articles from the solutions of the invention, e.g., tetrahydrofurane, water, acetone, methyl ethyl ketone, ethyl acetate, methyl or isopropyl alcohol or carbon tetrachloride.

The following examples further illustrate the invention.

Example I

Fiber-forming polyacrylonitrile was mixed with molten antimony trichloride (specific gravity=2.68) to yield a clear solution containing about 10% by weight of polymer.

The same polymer was also dissolved in a mixture of molten antimony trichloride and nitromethane to yield a clear solution containing about 10% by weight of polymer.

The solutions of this example could be extruded into non-solvents for the polymer such as acetone, methyl ethyl ketone, ethyl alcohol and carbon tetrachloride to form useful filaments.

Example II

Two parts by weight of a fiber-forming copolymer of 50 mol percent vinylidene cyanide and 50 mol percent vinyl acetate was dissolved in a mixture of 10 parts by weight of molten antimony trichloride at 70° C. and a volume of carbon tetrachloride equal to the volume of molten antimony trichloride to yield a clear solution which could be extruded into the non-solvents set out in Example I to yield useful filaments.

Example III

Fiber-forming polyethylene terephthalate was heated with molten antimony trichloride to 120° C. in an oil bath to yield clear polymer solutions containing 10 and 20% by weight of polymer. The solutions could be extruded into nonsolvents for the polymer, e.g., those set out in Example I, to yield useful filaments.

Example IV

A fiber-forming polyurethane prepared by condensing the bis(chloroformate) of butanediol-1,4 and tetramethylene diamine was dissolved in molten antimony trichloride as described in Example III to yield solutions containing 10 and 20% by weight of polymer. The solutions could be extruded into non-solvents for the polymer, e.g., water, tetrahydrofuran, acetone and methyl and isopropyl alcohols, to obtain useful filaments.

Examples V and VI

Polyureas formed by condensing phosgene with hexamethylene diamine and nonamethylene diamine respectively were each dissolved in molten antimony trichloride as described in Example III to yield solutions containing 10% by weight of polymer. The solutions could be extruded into non-solvents for the polymer, e.g., those set out in Example IV, to form useful filaments.

Example VII

Fiber-forming polyhexamethylene adipamide was dissolved in molten antimony trichloride to yield a solution containing about 10% by weight of polymer. The solution could be extruded into non-solvents for the polymer, e.g., those set out in Examples I and IV to form useful filaments.

Examples VIII and IX

A polysulfone formed by copolymerizing 50 mol percent of sulfur dioxide with 50 mol percent of butene-2 and another polysulfone formed by oxidizing with a solution of 90% by weight of hydrogen peroxide in 90% aqueous formic acid, a polysulfide formed by reacting 50 mol percent of hexamethylene di(sodium mercaptide) and 50 mol percent of hexamethylene dibromide, was each dissolved in molten antimony trichloride as described in Example III to yield solutions containing about 10% by weight of polymer. The solutions could be extruded into non-solvents for the polymer, e.g., those set out in Example I to obtain useful filaments.

It is to be understood that the foregoing detailed description is given merely by way of illustration and that many variations may be made therein without departing from the spirit of our invention.

Having described our invention what we desire to secure by Letters Patent is:

1. A process comprising dissolving a member of the group consisting of polymers having at least one member of the group consisting of nitrogen, oxygen and sulfur as an integral part of the polymer chain and polymers having only carbon atoms in the polymer chain and containing cyanide groups attached to some of said carbon atoms in a solvent selected from the group consisting of molten antimony trichloride and liquid mixtures consisting essentially of at least 60% by weight of antimony trichloride and up to 40% by weight of a diluent selected from the group consisting of acetone, carbon tetrachloride and nitromethane and extruding the resulting solution through an opening of predetermined cross-section to form a shaped article.

2. The process of claim 1, wherein said solution contains 5 to 30% by weight of polymer and is extruded into a liquid non-solvent for the polymer.

3. The process of claim 1, wherein said solvent contains a liquid diluent.

4. The process of claim 1, wherein said shaped article is a filament.

5. The process of claim 1, wherein said polymer is a fiber forming acrylonitrile polymer.

6. The process of claim 1, wherein said polymer is a fiber forming vinylidene cyanide polymer.

7. The process of claim 1, wherein said polymer is a fiber forming polyester.

8. The process of claim 1, wherein said polymer is a fiber forming polyurethane.

9. The process of claim 1, wherein said polymer is a fiber forming polyurea.

10. A solution of a polymer selected from the group consisting of polymers having at least one member of the group consisting of nitrogen, oxygen and sulfur as an integral part of the polymer chain and polymers having only carbon atoms in the polymer chain and containing cyanide groups attached to some of said carbon atoms, in a solvent selected from the group consisting of molten antimony trichloride and liquid mixtures consitsing essentially of at least 60% by weight of antimony trichloride and up to 40% by weight of a diluent selected from the group consisting of acetone, carbon tetrachloride and nitromethane, said solution containing 5 to 30% by weight of said polymer.

11. A solution of an acrylonitrile polymer in a solvent selected from the group consisting of molten antimony trichloride and liquid mixtures consisting essentially of at least 60% by weight of antimony trichloride and up to 40% by weight of a diluent selected from the group consisting of acetone, carbon tetrachloride and nitromethane.

12. A solution of vinylidene cyanide polymer in a solvent selected from the group consisting of molten antimony trichloride and liquid mixtures consisting essentially of at least 60% by weight of antimony trichloride and up to 40% by weight of a diluent selected from the group consisting of acetone, carbon tetrachloride and nitromethane.

13. A solution of a polyester in a solvent selected from the group consisting of molten antimony trichloride and liquid mixtures consisting essentially of at least 60% by weight of antimony trichloride and up to 40% by weight of a diluent selected from the group consisting of acetone, carbon tetrachloride and nitromethane.

14. A solution of a polyurethane in a solvent selected from the group consisting of molten antimony trichloride and liquid mixtures consisting essentially of at least 60% by weight of antimony trichloride and up to 40% by weight of a diluent selected from the group consisting of acetone, carbon tetrachloride and nitromethane.

15. A solution of a polyurea in a solvent selected from the group consisting of molten antimony trichloride and liquid mixtures consisting essentially of at least 60% by weight of antimony trichloride and up to 40° by weight of a diluent selected from the group consisting of acetone, carbon tetrachloride and nitromethane.

References Cited in the file of this patent

UNITED STATES PATENTS

| | | |
|---|---|---|
| 2,600,180 | Ardis | June 10, 1952 |
| 2,648,592 | Stanton et al. | Aug. 11, 1953 |
| 2,648,649 | Stanton et al. | Aug. 11, 1953 |
| 2,866,773 | Redfarn | Dec. 30, 1958 |